United States Patent
Veiga et al.

(10) Patent No.: US 6,740,607 B2
(45) Date of Patent: *May 25, 2004

(54) SUBSTRATE WITH STRETCH AND HEAT SEALING PROPERTIES TO MAKE A MULTIDIRECTIONAL RESTRAINT MODULE DESIGN

(75) Inventors: Manuel J. Veiga, Tewksbury, MA (US); Richard J. Satin, Swampscott, MA (US)

(73) Assignee: Bradford Industries, Inc., Lowell, MA (US)

( * ) Notice: Subject to any disclaimer, the term of this patent is extended or adjusted under 35 U.S.C. 154(b) by 267 days.

This patent is subject to a terminal disclaimer.

(21) Appl. No.: 09/956,640

(22) Filed: Sep. 19, 2001

(65) Prior Publication Data

US 2002/0187696 A1 Dec. 12, 2002

Related U.S. Application Data

(63) Continuation of application No. 09/327,245, filed on Jun. 7, 1999, now abandoned.

(51) Int. Cl.$^7$ .............................................. B32B 27/02
(52) U.S. Cl. .................. 442/149; 3/383; 139/384 R; 139/389; 139/387 R; 139/410; 106/287.13; 106/287.14; 280/728.1; 280/729; 280/733; 280/748.1; 428/34.1–36.9; 428/101; 428/166; 442/76; 442/164; 442/168; 442/169; 442/182; 442/203; 442/286
(58) Field of Search ....................... 3/383; 139/384 R, 139/389, 387 R, 410; 106/287.13–287.1; 280/728.1, 729, 733, 748.1; 442/76, 164, 168, 169, 182, 203, 286, 149; 428/34.1–36.9, 101, 166

(56) References Cited

U.S. PATENT DOCUMENTS

| 3,970,328 A | 7/1976 | Wallsten |
| 4,143,197 A | 3/1979 | Jasionowicz et al. |
| 4,284,682 A | 8/1981 | Frosch et al. |
| 4,560,611 A | 12/1985 | Naka et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,316,336 A | 5/1994 | Taguchi et al. |
| 5,399,402 A | 3/1995 | Inoue et al. |
| 5,514,431 A | 5/1996 | Shimomura |
| 5,529,837 A | 6/1996 | Fujiki et al. |
| 5,630,620 A | 5/1997 | Hirai et al. |
| 5,632,057 A | 5/1997 | Lyden |
| 5,647,079 A | 7/1997 | Hakamiun et al. |
| 5,650,207 A | 7/1997 | Crouch |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg et al. |
| 5,845,935 A | 12/1998 | Enders et al. |
| 5,863,644 A | 1/1999 | Bönigk et al. |
| 5,881,776 A | 3/1999 | Beasley, Jr. |

(List continued on next page.)

FOREIGN PATENT DOCUMENTS

WO    WO 00/78578 A1    12/2000

OTHER PUBLICATIONS

Publication of Clark–Schwebel Joint Ventures, C–S Integlas A.G., title page, Clark–Schwebel description page, contents, disclaimer page.

Parameters for Woven Fabric Selection (2 pages).

*Primary Examiner*—Arti R. Singh
(74) *Attorney, Agent, or Firm*—Holland Law Firm, P.L.C.

(57) ABSTRACT

The invention is directed to coating a plurality of polyurethane films onto a stretchable knit fabric substrate and heat sealing such substrates together to yield an air curtain or air bag having improved air-holding properties.

40 Claims, 1 Drawing Sheet

U.S. PATENT DOCUMENTS

| | | |
|---|---|---|
| 5,906,391 A | 5/1999 | Weir et al. |
| 5,921,287 A | 7/1999 | Bowen et al. |
| 6,037,279 A | 3/2000 | Brookman et al. |
| 6,042,141 A | 3/2000 | Welch et al. |
| 6,056,316 A | 5/2000 | Yamaji et al. |
| 6,073,961 A | 6/2000 | Bailey et al. |
| 6,113,141 A | 9/2000 | Baker |
| 6,149,194 A | 11/2000 | Breed et al. |
| 6,152,481 A | 11/2000 | Webber et al. |
| 6,168,191 B1 | 1/2001 | Webber et al. |
| 6,169,043 B1 | 1/2001 | Li |
| 6,176,515 B1 | 1/2001 | Wallner et al. |
| 6,177,365 B1 | 1/2001 | Li |
| 6,177,366 B1 | 1/2001 | Li |
| 6,199,898 B1 | 3/2001 | Masuda et al. |
| 6,200,915 B1 | 3/2001 | Adams et al. |
| 6,220,309 B1 | 4/2001 | Sollars, Jr. |
| 6,239,046 B1 | 5/2001 | Veiga et al. |
| 6,250,668 B1 | 6/2001 | Breed et al. |
| 6,270,113 B1 | 8/2001 | Wipasuramonton et al. |
| 6,294,487 B1 | 9/2001 | Keshavaraj |
| 6,344,251 B1 | 2/2002 | Keshavaraj et al. |
| 6,348,543 B1 | 2/2002 | Parker |
| 6,350,709 B1 | 2/2002 | Veiga |
| 6,364,356 B1 | 4/2002 | Keshavaraj |
| 6,429,155 B1 | 8/2002 | Li et al. |
| 6,455,449 B1 | 9/2002 | Veiga et al. |
| 6,458,724 B1 | 10/2002 | Veiga et al. |
| 2001/0005660 A1 | 6/2001 | Li et al. |
| 2001/0009829 A1 | 7/2001 | Sollars, Jr. et al. |
| 2001/0042980 A1 | 11/2001 | Sollars, Jr. |
| 2001/0049243 A1 | 12/2001 | Crouch et al. |

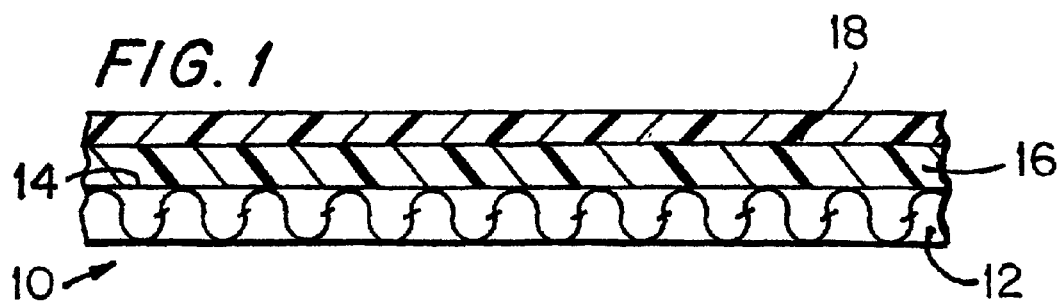
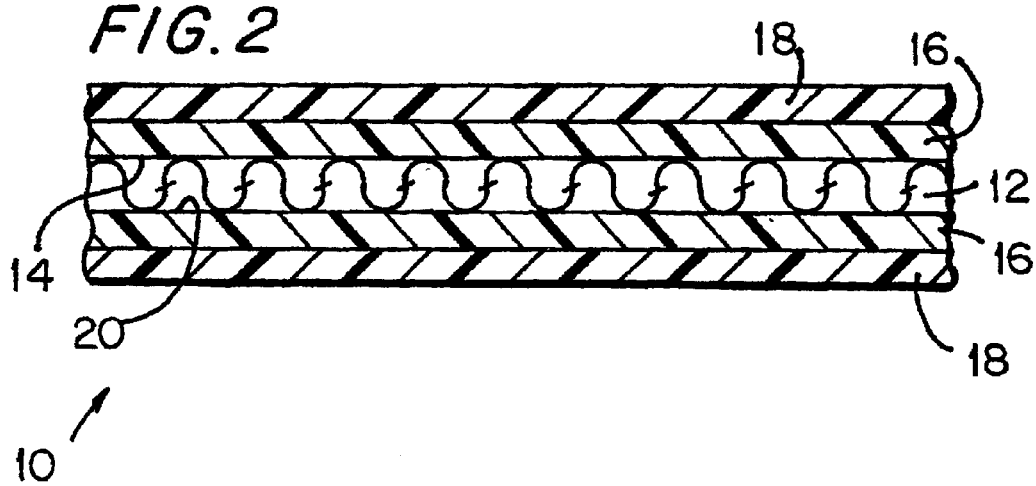
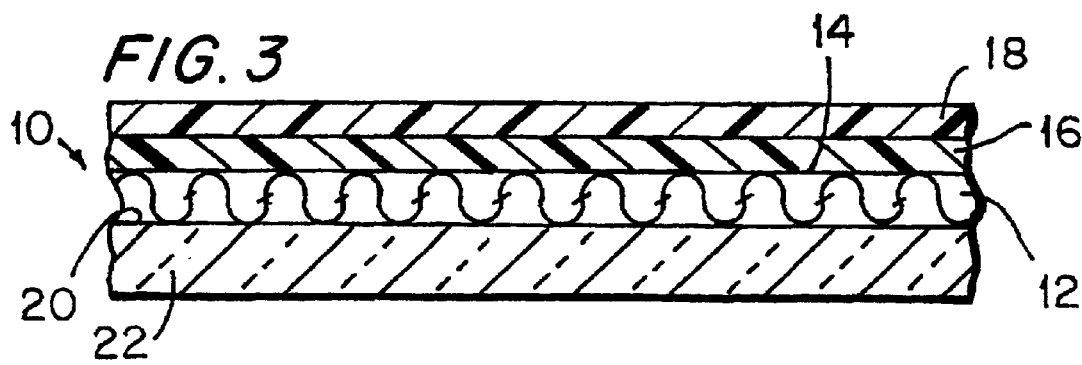

SUBSTRATE WITH STRETCH AND HEAT SEALING PROPERTIES TO MAKE A MULTIDIRECTIONAL RESTRAINT MODULE DESIGN

This application is a continuation of application Ser. No. 09/327,245, filed Jun. 7, 1999, now abandoned, the disclosure of which is incorporated by reference herein and made a part of this application.

FIELD OF THE INVENTION

This invention relates to a coated knit textile fabric for use in an air-holding vehicle occupant restraint system and, more particularly, to a fabric having a plurality of polymeric layers coated thereon for use in such a vehicle occupant restraint system, the method of coating said textile knit fabric, and the air-holding vehicle occupant restraint system formed from such coated fabric.

BACKGROUND OF THE INVENTION

The current restraint systems for vehicles include driver side air bags which are housed in the steering wheel in a collapsed, folded condition adapted to be deployed instantaneously in an inflated condition by injection of a gas upon the occurrence of a collision. The advent of such driver-side air bags has resulted in a significant decrease in auto fatalities.

Air bag restraint systems have also been located in the dashboard in order to provide a comparable measure of protection to the passenger seated adjacent the driver.

The automotive industry has recently introduced air bags which are housed in the backs of the front seats or in the rear seats to protect the cabin occupants in the event of a collision occurring on either side of the vehicle.

A still further safety feature which is being marketed for passenger vehicles, especially sport utility vehicles (SUV), are air-holding curtains designed to provide a cushioning effect in the event of roll-over accidents. These curtains are housed in the roof of the vehicle and deploy along the interior sidewalls of the SUV's cabin in the event of a rollover.

One means of improving the efficacy of air-holding vehicle restraint systems has addressed the coatings to be applied to the textile substrate to improve air retention.

In the prior art, coated air bags were made by coating a nylon substrate with chloroprene or silicone. They were not, however, susceptible to heat sealing. In order to ameliorate the problems inherent in chloroprene and silicone rubber coatings, it has been disclosed in the art, for example, Menzel, U.S. Pat. No. 5,110,666, to coat knitted and woven nylon and polyester substrates with polyurethane to provide the desired permeability to better retain the inflation gas.

The use of a polyurethane coated fabric for use in garments and bags is disclosed in Tschirch et al., U.S. Pat. No. 4,284,682 which is assigned to NASA. This patent discloses a process for forming a polyurethane elastomeric film on woven or knitted fabrics made from cotton, rayon, polyester, polyamide, etc. and laminating with pressure and heat. This patent discloses laminating a single layer of polyurethane film on a fabric in order to assure that garments or bags made therefrom would be leakproof.

Despite the advances in air bag coating technology, the problems of controlling air permeability, air pressure, and volume still remain. Another problem resulting in air loss stems from the fact that during the manufacture of the air bags, they are stitched shut by means of sewing. Inherently, each stitch creates a potential leak which adversely affects the integrity and, hence, the air holding capability of the bag, especially when instantaneous deployment of an operative airbag is required.

With the advent of SUV's, the provision of adequate protection to passengers in the event of multiple rollovers has become of prime importance. One means of obtaining such protection is by providing air curtains which are disposed in a collapsed condition in the header of the SUV and which deploy in the event the vehicle rolls over. The air-holding capability of such air curtains is critical since they must remain inflated for an extended period of time. Unlike air bags which are designed to inflate instantaneously, and also deflate almost instantaneously in order to avoid injury to the driver or the passenger from the bag itself, air curtains used in an SUV, or in a passenger vehicle, must be capable of remaining inflated in the range of about three (3) to about twelve (12) seconds, depending upon the size of the curtain used and the type of vehicle employed. The maximum inflation period should be sufficient to protect the cabin occupants during three (3) rollovers, which are the maximum number of rollovers which are usually experienced.

SUMMARY OF THE INVENTION

It has now been found that by coating a plurality of polyurethane layers onto a stretchable fabric substrate, followed by heat-sealing two of such coated substrates together, yields an air-holding restraint system which has superior air-holding characteristics, viz., permeability, as well as volume and pressure retention.

BRIEF DESCRIPTION OF THE DRAWINGS

FIG. 1 is a cross-sectional view of a textile substrate having a plurality of polyurethane coating layers on one surface in accordance with the present invention.

FIG. 2 is a cross-sectional view which depicts a textile substrate having a plurality of polyurethane coating layers on one surface in accordance with the embodiment of FIG. 1 and a polysiloxane coating on the opposite or reverse surface.

FIG. 3 is a cross-sectional view which depicts a textile substrate leaving a plurality of polyurethane coating layers on one surface in accordance with the embodiment of FIG. 1 and a polyurethane coating on the opposite or reverse surface.

In describing the figures, similar parts in the various embodiments will be referred to by the same numerals.

DETAILED DESCRIPTION OF THE INVENTION

It has been found that when a surface of a textile substrate having opposed surfaces is initially coated with an adhesive polyurethane layer and, thereafter, with an elastomeric polyurethane layer, the coated substrate when converted into an air-holding restraint system by joining two (2) such coated substrates together by heat sealing, yields a restraint system having improved air retention.

Either a polyamide or a polyester can be employed as the textile fabric substrate, provided it is a knit fabric having multidirectional stretch characteristics. By using a knit fabric as the textile substrate, it will provide the occupants with the desired pillowing or cushioning effect during a rollover. Since woven materials lack stretchability, they would not confer the same degree of protection.

Exemplary of the knitting methods which can be employed to make the knit fabrics are circular knitting, raschel knitting, interlock knitting, etc. Circular knitting is preferred since the wales and courses are uniform, and the stretchability is uniform in all directions. Any type of denier size can be employed to advantage. The shape or configuration to be employed in the air holding restraint system will depend upon its ultimate location in the vehicle. For example, driver or passenger air bags will generally be elliptical, spherical or circular, while air curtains will generally be rectangular in configuration.

The coating of the knitted fabric substrate with layers of polyurethane can be achieved by various coating methods, such as, for example, laminating and cast coating. While cast coating will be discussed herein in an exemplary manner, it is to be understood that the method of the present invention for coating polyurethane film to a stretchable knit substrate is not limited thereto.

In cast coating, as opposed to conventional coating, the coating is applied to a release liner or paper, i.e., a paper substrate typically coated with a releasable silicone. The release paper provides a means similar to a conveyor belt, for example, for coating polymers on the surface of the release paper without drying out the polymers. When the coating operation is completed, the release paper can be stripped off and one is left with the composite structure which has been built up.

An elastomeric polyurethane layer is coated onto a silicone release paper. The elastomeric layer is from about 30% to about 100% solids by weight of an aromatic or aliphatic polyether or polyester polyurethane, with an aromatic polyether polyurethane being preferred. Optionally, depending on the chemical and physical properties sought to be introduced into the air curtain or air bag which is ultimately made from the coated fabric, there is added to the elastomer, for example, flame-proofing agents such as aluminum trihydrate or antimony trioxide, mildew prevention agents, such as BP5® by Morton Thiokol, and UV and ozone resistance agents, such as TINUVUN 765® by Ciba Geigy.

The thickness of the elastomeric polyurethane film is within the range of about 0.5 mils to about 8.0 mils, with about 2 mil being preferred. The elastomeric polyurethane film on the release paper is then dried by passing it into an oven at an elevated temperature of from about 350° F. to about 450° F.

Thereafter, an adhesive polyurethane layer is laid down atop the elastomeric polyurethane layer. The polyurethane used in the adhesive coat can be selected from among aliphatic and aromatic polyether polyurethanes and aliphatic and aromatic polyester polyurethanes, preferably those having a solids content of from about 30% to about 60%, by weight. The thickness of the adhesive polyurethane film is from about 0.5 mils to about 2.5 mils, with about 1.5 mils being preferred.

Thereafter, continuing the cast coating process, the adhesive polyurethane layer which has not been dried and which is still in the wet condition, has applied thereto a multidirectionally-stretchable knitted textile substrate.

The composite structure of polyurethane coated knit textile fabric is then dried by passing it into an oven maintained at about 225° F. to about 425° F. for about 1.5 minutes to about 3.0 minutes. The composite is advanced at a speed of about 1,000 yds per hour to about 3,000 yards per hour, with about 1,200 yds. per hour being preferred.

Thereafter, upon exiting from the oven, the silicone release paper is stripped off leaving the polyurethane knit composite structure depicted in FIG. 1. Embodiments of composite structures of the present invention are set forth hereinafter with reference to the drawing figures.

In one embodiment of the present invention, as can be seen by reference to FIG. 1, a composite structure, generally denoted by the numeral 10, includes a knitted fabric substrate 12, depicted with its upper or top surface 14 coated with a film 16 of an adhesive polyurethane, which is referred to as the prime or adhesive coat. This serves to adhesively bond the filaments of the textile substrate so they do not comb or unravel.

Preferably, the adhesive or prime coat layer 16 completely covers the entire surface 14 of the knit fabric 12. Alternatively, it can be applied as a partial coating designed to coincide with a particular area of the fabric. Also, particular patterns, such as stripes, wavy lines, etc., with different coating weights can be employed to obtain the level of air permeability desired.

Referring still to FIG. 1, a second layer of an elastomeric polyurethane film 18 is depicted. The elastomeric film layer 18 is about 30% to about 100% solids, by weight, of an aliphatic or aromatic polyether or polyester polyurethane.

The composite structure depicted in FIG. 1, will, in accordance with the present invention, typically form a single panel of an air bag or an air curtain after die cutting into the desired configuration by the air bag manufacturer. A complementary composite structure, similar in all respects to the structure of FIG. 1, forms the opposite panel of the airbag or air curtain. In accordance with the present invention, the two (2) panels are sealed together about their peripheries by sealing the polyurethane layers together by radio frequency (RF) sealing, hot air sealing or ultrasonic sealing at from about 10 to about 80 megahertz and at about 250° F. to about 450° F., with radio frequency sealing being preferred. Sealing in this manner serves to insure improved control of the air permeability of the curtain or bag, while maintaining its integrity against air leakage, since the problems realized by conventional closing, such as stitching or sewing with their attendant air inherent leakage problems, are avoided. Employing a polyurethane-radio frequency sealing system is especially important in the manufacture of air-filled tubular curtains since air must be held in the tubular structures comprising the curtain for longer periods of time than with a conventional airbag. Such curtains must open within 2 to 3 milliseconds and must stay inflated for from about 3 to about 12 seconds after deployment in the event of multiple rollovers, say, three (3) such rollovers in a single incident.

In another embodiment of the present invention, as depicted in FIG. 2, the outer surface 14 of knit fabric 12 is coated with the same polyurethane film layers depicted in FIG. 1. However, in this embodiment, inner surface 20 of the knitted textile substrate is also coated with an adhesive polyurethane film 16 and an elastomeric polyurethane film layer 18.

In another embodiment of the present invention, as depicted in FIG. 3, surface 14 of knit fabric 12 is coated with the same polyurethane film layers as depicted in FIG. 1. However, in this embodiment, the bottom or inner surface 20 of fabric substrate 12 has a layer of a polysiloxane 22 coated thereto. It is then dried in an oven at elevated temperature, say, about 250° F. to about 450° F. and vulcanizes with the textile substrate. The polysiloxane is preferably a silicone rubber elastomer. The coating weight of the polysiloxane layer 22 on surface 20 is from about 0.5 ounces per square yard to about 5.0 ounces per square yard, with 1.2 ounces per square yard preferred. The silicone coating provides added protection to the fabric to protect against the high temperatures encountered during inflation with hot gases.

When the manufacturer converts two of the polyurethane coated knit substrates into an impermeable air curtain or air bag by radio-frequency sealing, each of the panels employed can be made according to FIGS. 1, 2, or 3, or combinations thereof, depending upon the ultimate characteristics to be designed into the end product, i.e., air curtain or air bag.

In another embodiment of the present invention, which is especially advantageous in the manufacture of air curtains, it is desirable to employ a stretchable multidirectional knit fabric in the air bag panel which will ultimately deploy within the passenger cabin to provide a cushioning effect to the occupants. Sealed to that panel, by radio frequency sealing in accordance with the present invention, would be a polyurethane coated woven polyamide or polyester fabric panel, for example a ballistic nylon, which would deploy adjacent the side windows, and which would be puncture resistant to broken glass, sharp projectiles, rocks and the like to offer added protection to the passengers. Thus, the air curtain would comprise a composite structure wherein a polyurethane coated stretchable knit fabric would be heat sealed to a polyurethane coated to a woven polyamide or polyester to provide cushioning on the knit surface and toughness and durability on the nylon surface.

What is claimed is:

1. A coated textile substrate for an air-holding vehicle restraint system, which comprises:
   a) a textile substrate of a stretchable knit fabric having opposed surfaces;
   b) a first coating layer of an adhesive polyurethane on a surface of said textile substrate; and
   c) a second coating layer of an elastomeric polyurethane on said first coating layer.

2. The coated textile substrate of claim 1 wherein said textile substrate is a fabric constructed from synthetic fibers.

3. The coated textile substrate of claim 2 wherein the synthetic fibers are selected from the group consisting of polyamides and polyesters.

4. The coated textile substrate of claim 1 wherein the adhesive polyurethane layer is selected from the group consisting of aliphatic or aromatic polyester or polyether polyurethanes.

5. The coated textile substrate of claim 1 wherein the adhesive polyurethane layer is a film having a thickness of from about 0.5 mils to about 2.5 mils.

6. The coated textile substrate of claim 5 wherein the thickness of the adhesive polyurethane film is about 1.5 mils.

7. The coated textile substrate of claim 1 wherein the elastomeric polyurethane layer is an aliphatic or aromatic polyether or polyester polyurethane having from about 30% to about 100% solids, by weight.

8. The coated textile substrate of claim 1 wherein the elastomeric polyurethane layer is a film having a thickness of from about 0.5 mils to about 8.0 mils.

9. The coated textile substrate of claim 8 wherein the elastomeric polyurethane film has a thickness of about 2 mils.

10. The coated textile substrate of claim 1 wherein the other surface is coated with an adhesive polyurethane forming a first coating layer and a second coating layer of an elastomeric polyurethane on said first coating layer.

11. The coated textile substrate of claim 1 wherein the other surface of said knitted textile substrate is coated with a polysiloxane.

12. An air-holding vehicle restraint system, comprising:
   a pair of heat-sealed polyurethane coated knitted textile substrates;
   the outer surface of each substrate having an adhesive polyurethane film and an overlying elastomeric polyurethane film.

13. The restraint system of claim 12 wherein the heat sealed substrates form an air-tight connection.

14. The restraint system of claim 12 wherein the knitted textile substrates are heat-sealed about their peripheries.

15. The restraint system of claim 12 wherein the textile substrates are sealed by radio frequency sealing, hot air sealing or ultrasonic sealing.

16. The restraint system of claim 15 wherein the substrates are sealed by radio frequency sealing at from about 10 to about 80 megahertz.

17. The restraint system of claim 12 wherein the air-holding restraint system is an air bag.

18. The restraint system of claim 12 wherein the air-holding restraint system is an air curtain.

19. The restraint system of claim 12 wherein the knitted textile substrates are selected from the group consisting of polyesters, polyamides or other synthetic fibers.

20. The restraint system of claim 12 wherein the adhesive polyurethane coating layer is selected from the group consisting of aliphatic or aromatic polyester or polyether polyurethanes.

21. The restraint system of claim 12 wherein the adhesive polyurethane film has a thickness of from about 0.5 mils to about 2.5 mils.

22. The restraint system of claim 21 wherein the film thickness is about 1.5 mils.

23. The restraint system of claim 12 wherein the elastomeric polyurethane film is an aliphatic or aromatic polyether or polyester polyurethane having a solids content of from about 30% to about 100%, by weight.

24. The restraint system of claim 12 wherein the elastomeric polyurethane film has a thickness of from about 0.5 mils to about 8.0 mils.

25. The restraint system of claim 24 wherein the elastomeric polyurethane film has a thickness of about 2.0 mils.

26. An air-holding vehicle restraint system, comprising:
   a polyurethane coated knitted textile substrate heat-sealed to a polyurethane coated woven textile substrate;
   the outer surface of each substrate having an adhesive polyurethane film and an overlying elastomeric polyurethane film.

27. The restraint system of claim 26 wherein the heat sealed substrates form an air-tight connection.

28. The air-holding vehicle restraint system of claim 26 wherein the textile substrates are heat-sealed about their peripheries.

29. The restraint system of claim 26 wherein the textile substrates are sealed by radio frequency sealing, hot air sealing or ultrasonic sealing.

30. The restraint system of claim 29 wherein the substrates are sealed by radio frequency sealing at from about 10 to about 80 megahertz.

31. The restraint system of claim 26 wherein the air-holding restraint system is an air bag.

32. The restraint system of claim 26 wherein the air-holding restraint system is an air curtain.

33. The restraint system of claim 26 wherein the knitted textile substrate is selected from the group consisting of polyesters, polyamides or other synthetic fibers.

34. The restraint system of claim 26 wherein the woven textile substrate is nylon.

35. The restraint system of claim 26 wherein the adhesive polyurethane coating layer is selected from the group consisting of aliphatic or aromatic polyester or polyether polyurethanes.

36. The restraint system of claim 26 wherein the adhesive polyurethane film has a thickness of from about 0.5 mil to about 2.5 mils.

37. The restraint system of claim 36 wherein the film thickness is about 1.5 mils.

38. The restraint system of claim 26 wherein the overlying elastomeric polyurethane film is an aliphatic or aromatic polyether or polyester polyurethane having a solids content of from about 30% to about 100%, by weight.

39. The restraint system of claim 38 wherein the overlying elastomeric polyurethane film has a thickness of from about 0.5 mils to about 8.0 mils.

40. The restraint system of claim 39 wherein the elastomeric polyurethane film has a thickness of about 2.0 mils.

* * * * *